US008942994B2

(12) United States Patent
Hanina et al.

(10) Patent No.: US 8,942,994 B2
(45) Date of Patent: Jan. 27, 2015

(54) METHOD AND APPARATUS FOR ENCOURAGING CONSUMPTION OF A PRODUCT

(75) Inventors: Adam Hanina, New York, NY (US); Lei Guan, Harrison, NJ (US); Gordon Kessler, Mount Kisco, NY (US)

(73) Assignee: AIC Innovations Group, Inc., New York, NY (US)

(*) Notice: Subject to any disclaimer, the term of this patent is extended or adjusted under 35 U.S.C. 154(b) by 56 days.

(21) Appl. No.: 13/369,757

(22) Filed: Feb. 9, 2012

(65) Prior Publication Data
US 2013/0211889 A1  Aug. 15, 2013

(51) Int. Cl.
*G06Q 30/00* (2012.01)
*G06Q 30/02* (2012.01)

(52) U.S. Cl.
CPC ........ *G06Q 30/0269* (2013.01); *G06Q 30/0224* (2013.01)
USPC .................. 705/14.66; 705/14.49; 705/14.25

(58) Field of Classification Search
USPC ...................................................... 705/14.11
See application file for complete search history.

(56) References Cited

U.S. PATENT DOCUMENTS

| 7,095,416 | B1* | 8/2006 | Johns et al. ............. 345/522 |
| 7,643,658 | B2* | 1/2010 | Kilner et al. ............. 382/118 |
| 2006/0212355 | A1 | 9/2006 | Teague et al. | |
| 2010/0005105 | A1 | 1/2010 | Zhang et al. | |
| 2010/0030355 | A1 | 2/2010 | Insolia et al. | |
| 2010/0125490 | A1 | 5/2010 | Kiciman et al. | |
| 2011/0028160 | A1 | 2/2011 | Roeding et al. | |
| 2011/0184792 | A1 | 7/2011 | Butcher et al. | |

OTHER PUBLICATIONS

Mintchell, "Exploring the Limits of Machine Vision", Automation World, Oct. 1, 2011.*
Daily Free Games, "Ghost Man Advanced Info", Dec. 21, 2008, on line at dailyfreegames.com/games/arcade-games/ghost-man-advanced.html.*
Katusak, "Incentives, Motivation and Workplace Performance: Research & Best Practices", International Society for Performance Improvement, 2002, found on line at loyaltyworks.com/incentive-program-research-articles/ispifullpdf.pdf.*
Non-Final Office Action from PTO, Cited in (U.S. Appl. No. 13/216,099), (Feb. 14, 2012), 1-22.
PCT Search report and written opinion, Cited in (PCT/US12/051659), (Nov. 2, 2012), 1-7.

(Continued)

*Primary Examiner* — John G Weiss
*Assistant Examiner* — Scott C Anderson
(74) *Attorney, Agent, or Firm* — Gordon Kessler (57) ABSTRACT

A method and apparatus for engaging consumers in the performance of predetermined action. The method comprises the steps determining performance of a predetermined action, providing feedback related to the determined performance of the predetermined action, and broadcasting confirmation of performance of the predetermined action along with at least a portion of the provided feedback. An incentive be provided based upon performance of the predetermined action, or upon broadcasting. The predetermined action may include eating a candy or other edible item. The feedback may include material related to an advertising campaign, or otherwise related to the candy or edible item.

18 Claims, 4 Drawing Sheets

(56) References Cited

OTHER PUBLICATIONS

Strong, "Where Can You Find Your Customer", Atlas Institute, 2007, found on line at atlassolutions.com/wwdocs/user/atlassolutions/en-us/insig hts/dmi-CombinedImpactSearchDisplay.pdf.
Office Action dated Feb. 14, 2013 in U.S. Appl. No. 13/216,099, pp. 1-38.
Niebles, J. .C, Wang, H., and Fei-Fei, L. *Unsupervised Learning of Human Action Categories Using Spatial-temporal Words.* Int J Comput Vis. Mar. 16, 2007, pp. 1-20.
Final Office Action dated Jul. 15, 2013 in U.S. Appl. No. 13/216,099, pp. 1-18.
Ijsselmuiden, Joris, and Stiefelhagen, Rainer. "Towards High-Level Human Activity Recognition through Computer Vision and Temporal Logic." *KI'10 Proceedings of the 33rd annual German conference on Advances in artificial intelligence.* (2010) pp. 426-435.
Turaga, Paul; Chellappa, Rama; Subrahmanian, V. S.; and Udrea, Octavian. "Machine Recognition of Human Activities: A survey." *IEEE* (2008).
Gomez-Conde, Ivan; Olivieri, David; Vila, Xose Anton; and Orozco-Ochoa, Stella. "Simple Human Gesture Detection and Recognition Using a Feature Vector and a Real-Time Histogram Based Algorithm." *Journal of Signal and Information Processing.* (2011) vol. 2, pp. 279-286.
Aggarwal, J. K. and Ryoo, M. S. "Human Activity Analysis: A review." *ACM Computing Surveys (CSUR).* (Apr. 2011) vol. 43, Issue 3, Article No. 16.
Office Action dated Mar. 12, 2014 in U.S. Appl. No. 13/216,099, pp. 1-21.
Office Action dated Aug. 1, 2104 in U.S. Appl. No. 13/216,099, pp. 1-31.

\* cited by examiner

METHOD AND APPARATUS FOR ENCOURAGING CONSUMPTION OF A PRODUCT

FIELD OF THE INVENTION

This invention relates generally to the monitoring of individuals performing one or more predetermined activities, and more particularly to automated monitoring of one or more individuals performing one or more actions related to one or more items. The results of such monitoring may be employed to update status in a social networking context, such as updating social network status in accordance with the one or more actions, to update a status in a live social or other situation, or to otherwise broadcast the results of the monitoring. Incentives may also be provided in accordance with the updating social network or live social status in accordance with the one or more actions. Indications of correct performance of the one or more predetermined activities may be provided on a device used for monitoring in order to provide near immediate feedback to the individual.

BACKGROUND OF THE INVENTION

Advertising of products has generally been a passive endeavor. The manufacturer or salesperson advertises goods for sale, and the consumer purchases. More recently, viral marketing has allowed for the distribution of advertising material to a vast network of individuals. In the case of social networking sites, peers of a particular user may be targeted as being associated with a particular user. However, in any of these scenarios, the participant and peers are still uninvolved viewers of advertising content.

Therefore, it would be desirable to provide a method and apparatus that overcome the drawbacks of the prior art and provides more active participation of users in advertising.

SUMMARY OF THE INVENTION

In accordance with the invention, direct observation of activity of a subject, such as the watching of a consumer consuming, placing, holding, wearing, eating or otherwise interacting with a consumable item, such as a candy or the like, may be provided. Such direct observation may be provided through activity recognition or other machine and computer vision techniques. Upon such visual confirmation of consuming a candy or the like, a visual indication at a point of monitoring or elsewhere, such as by a broadcast to a social media platform, or other action indicating that the subject has performed the action, may be provided. Other actions may include drinking, eating wearing, playing, purchasing or the like. Visual confirmation is preferably provided to an individual on a display of a device, such as a smart phone, or any other device including a display and a camera, being used to monitor such activity, but may also be provided as an automatic or other update to a profile on a social networking site, email or direct text messages to one or more indicated individuals, announcement in a particular location, such as through the user of a publicly-viewable display or electronic billboard or the like. Such visual confirmation may also comprise a display of material on the display about the face of the individual, and in the case of consuming a candy, may comprise one or more advertising or other indications of relation of the displayed material to the consumed candy, and may further include animations, images, text, signs, augmented reality material or the like. Thus, the name of the candy, audio information and other advertising or identifying material may be provided. Such broadcasting may further include broadcasting a video recording of the subject performing the confirmed action along with one or more of the included visual confirmation information (and may be provided in a rotoscope, summary, or other lower resolution display format), and may further comprise posting such video to a social networking site. Upon confirmation of such activity, such visual indication on the local monitoring device, broadcast, or such posting, may offer some benefit or other incentive or reward may be provided to the subject. Such benefits may include points, monetary rewards, product rewards or the like.

In accordance with one or more particular embodiments of the present invention, a participant may employ an activity recognition algorithm, object recognition algorithm or the like, employing machine vision on a mobile communication device for determining the performance of one or more predetermined actions, such as eating a candy or the like employing object recognition using the recorded video information. Upon recognition of performance of such an action, a display of material on the display of the mobile communication device may be provided related to the candy eaten, providing additional advertising, incentive or other related material. Additionally, one or more social media network statuses may be updated, and a video file including a sequence of images showing performance of the action may be provided, along with any provided display of visual material, which may be the same or different from what was provided to the individual on the mobile communication device. Upon update of the social media network status, one or more incentives related to the action may be provided to the individual or to social media relations of the individual.

In accordance with one or more additional embodiments of the present invention, a participant may employ an activity recognition algorithm employing computer vision for determining the performance of one or more predetermined actions. Upon recognition of performance of such an action, such as eating a candy, holding a candy, holding the packaging of a candy, or any other product or the like, and preferably identifying the brand of the candy or other product, one or more indicia of completion of performance may be provided, and a broadcast of a video clip of the action being performed including the indicia of completion, superimposed, or otherwise included with the display may be shown in any desired location. The location may comprise a display in a public location, over television or the like broadcast to multiple sites, though contact with one or more predetermined individuals, or on an individual mobile device or the like, including a mobile or other device being employed for performing steps to determine the performance of the one or more predetermined actions. The broadcast may comprise one or more information displays, such as through the use of animations representative of one or more users or actions, and may further include information about the consumable item, or action taken in relation thereto. Further information may be provided, including statistics related to consumption of the consumable for the particular individual, or across groups of individuals. Furthermore, users may selectively opt in to allow for various facial recognition techniques to be used, thus allowing one or more images to be captured of the individual user, of a group of individuals in which the individual user is the primary actor, or in which the individual is one of a group of participants, thus automatically detecting and logging activity. Upon such broadcast, one or more incentives related to the action may be provided to the participant, such as or more promotional items related to the performed action.

In a more particular embodiment of the invention, the participant may be encouraged to consume an item in view of a web camera on their mobile device, or other appropriate computing device including a display and a camera, such as a more permanent installation at a particular location, such as at a bar, restaurant or other public location. The device may employ an activity recognition algorithm employing computer vision for determining that the participant has consumed the item. Identification of the item may be employed for an initial opt-in to the system. Scanning of a barcode or other unique identifier may further be employed Furthermore, facial recognition techniques or the like may be employed to identify a particular person Upon recognition of the consuming of the item, one or more social media network statuses may be updated, and a video file including a sequence of images depicting consumption of the item along with the one or more details of the feedback provided to the user may be provided. One or more trends of consumption may be tracked, as in the number of times a particular item has been consumed. Upon update of the social media network status, one or more incentives related to the consuming of the item may be provided to the participant.

In U.S. patent application Ser. No. 12/620,686 filed Nov. 18, 2009 titled Method and Apparatus for Verification of Medication Administration Adherence; Ser. No. 12/646,383 filed Dec. 23, 2009 titled Method and Apparatus for Verification of Clinical Trial Adherence; Ser. No. 12/646,603 filed Dec. 23, 2009 titled Method and Apparatus for Management of Clinical Trials; and Ser. No. 12/728,721 filed Mar. 22, 2010 titled Apparatus and Method for Collection of Protocol Adherence Data, the entire contents of each of these applications being incorporated herein by reference, a system and method have been proposed that allow for complete control and verification of adherence to a prescribed medication protocol or machine or apparatus use in a clinical trial or other setting, whether in a health care provider's care, or when self administered in a homecare situation by a patient. In U.S. patent application Ser. No. 13/216,099, filed Aug. 23, 2011 to Hanina, the entire contents thereof being incorporated herein, an inventor of the present invention presents a method and apparatus for social network updates by activity recognition. The present invention builds on the descriptions in this application, providing a further response to the eating of a candy, that of presentation of direct advertising or other related material with an image of the user on a display of a device being used to determine whether the user has eaten the candy, or on other platforms as described. The present invention suggests extension of this activity recognition sequence to various social and other settings, providing a system for providing immediate, relevant, and possibly fun feedback to an individual performing the activity sequence, such as eating a candy, and for also publicizing recognition of the activity sequence along with any material comprising the immediate, relevant and possibly fun feedback, and for possibly providing one or more incentives to the participant upon confirmation of performance of such activity.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

The invention will now be described making reference to the following drawings in which like reference numbers denote like structure or steps.

Figure 1:
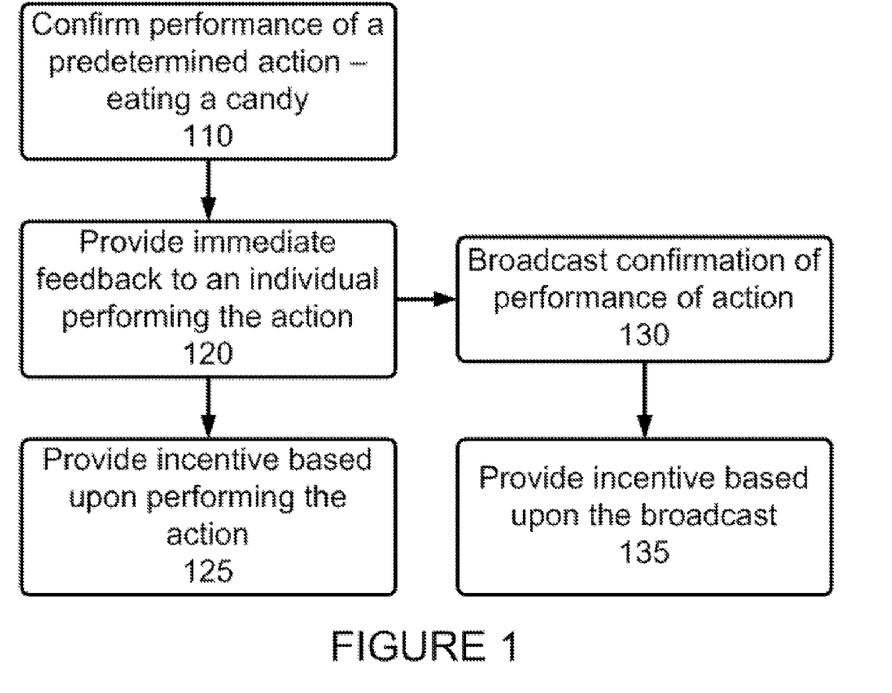
FIG. 1 is a flowchart diagram depicting an embodiment of the invention.

Referring first to FIG. 1, a flowchart diagram depicting first embodiment of the present invention is shown. At step 110, a predetermined action of a participant, such as that of eating a candy, displaying the item on their tongue, holding the item in their mouth, or the like is confirmed. In accordance with various embodiments of the present invention such confirmation is preferably determined in accordance with one or more computer vision or activity recognition techniques, and may employ an application on a mobile device using a web camera with a display, a more general web camera and a public display, or the like. After such recognition, at step 120, a confirmation of the performance of the predetermined action is determined, and immediate feedback is provided to the participant via a display associated with the mobile device or other appropriate device. Such immediate feedback may include, for example, visual advertising material, audio advertising material, or any other related material. In a particular embodiment, one or more of such material may follow the face of the participant about the display, or may otherwise interact with the face or other portion of the participant, or other object on the display. In addition to providing such immediate feedback to the participant, the action and immediate feedback may be broadcast at step 130. It is anticipated that such broadcast may take any form, such as electronic dissemination, location based notifications, video presentations, text messaging or images, audio descriptions or other audio information and the like. Finally, after confirmation of such action having been preformed, or notification of performance of such action having been broadcast, the participant may be provided with an incentive at one or steps 125 and 135. The incentive may be monetary or otherwise, and may act to encourage the participant or others to perform similar actions. Thus, the incentive may also be provided to others viewing the broadcast. Such incentives may be provided directly to one or more individuals, or may comprise a lottery system, thus allowing for multiple individuals to potentially win a larger incentive prize.

This or any other embodiment of the invention may also be applied to multi-player situations, where the performance of the predetermined action by two or more participants may also be determined, thus allowing for the group application of the action, thus increasing the social aspect of the process, possibly allowing for additional group gaming scenarios.

Social network broadcasting of such group activities have the potential of reaching substantially more individuals, especially if facial or other recognition or tagging techniques are employed in order to identify the two or more participants.

It is further contemplated in accordance with one or more embodiments of the present invention that one or more of the object recognition techniques may be employed to differentiate between different items, such as different candies, or even different colors or shapes of a single candy type or brand. Different participant feedback may be provided upon recognition of each candy type, color or shape. Furthermore, prompting may be provided in order to encourage a participant to find and consume a particular type, color, shape, etc. of candy. Such gaming may also be included in a type of scavenger hunt, encouraging participants to seek out and find particular types, shapes, colors of candy. Indeed, a candy manufacturer may be encouraged to produce candy packages with limited edition colors and shapes, and then providing additional incentive for participants to seek and find these limited edition colored candy for consumption in accordance with the system. This has the potential to produce a "Willy Wonka" effect of participants purchasing product in order to find a valuable limited edition version. This feature may be combined (or separately) with a time based reward system. Thus, one or more participants may receive a notice to consume a particular item within a predetermined period of time, preferably a short period of time, to win a prize, or perhaps be entered into a lottery for a grand prize.

Figure 2:
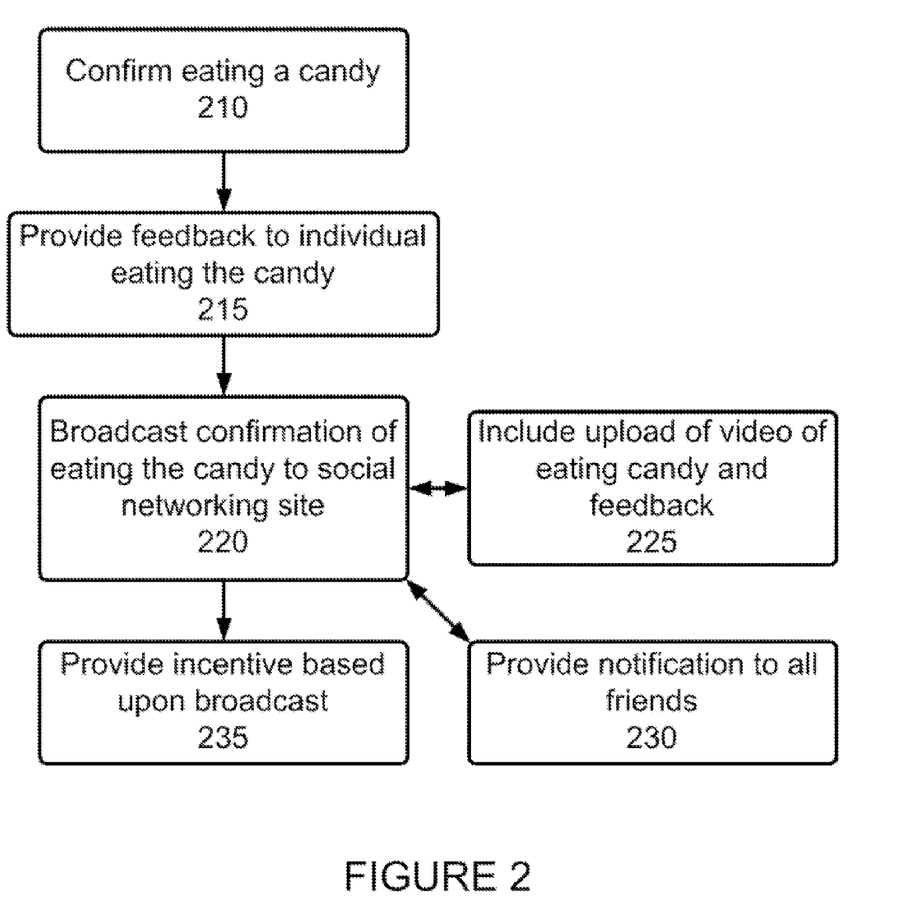
FIG. 2 is a flowchart diagram depicting an alternative embodiment of the invention in a social media environment.

Referring next to FIG. 2, a more particular embodiment of the invention will be described. In FIG. 2, at step 210, performance of consuming of a consumable item, such as eating a candy or the like by a participant is confirmed. In accordance with various embodiments of the present invention such confirmation is preferably determined in accordance with one or more machine vision or activity recognition techniques, and may employ one or more activity recognition techniques noted above in one or more of the referenced US Patent Applications. Object recognition may be employed to identify such an item, and may further be employed to confirm a brand of an item. Analysis may be employed in order to determine a confidence of the system that the user has actually eaten the candy. This confidence level may be determined based upon various information, such as time on task, movements by the user, shadows, poor lighting, or any other environmental or other factor that may decrease the confidence with which an automated computer vision system may confirm consuming of the consumable item.

In particular, many factors may come into play regarding the confidence with which a determination of consumable item consumption may be made. Thus, the detection of certain actions or circumstances of administration by the inventive system may be considered in determining a confidence of consumption. Various of these factors may be tracked, and comprise a time sequence of behavioral markers by the user that may be used in aiding determination of consumption of the consumable item. Furthermore, machine learning of trends may be provided to understanding one or more variables that may aid in proper determination of consumption, thus allowing for encouraging of such consumption. Various decision fusion learning systems may be employed in order to aid in making determinations regarding the various characteristics that may be reviewed and used to make such consumption determination decisions.

Additionally, in order to further aid in consumption determination, audio information may further be employed. Thus, in addition to visual information being used to determine action, signature sounds corresponding to one or more particular actions may be employed to either determine action, or aid in improving a confidence that an action was taken that was observed visually. Audio signatures may be employed to determine opening of a wrapper, ripping of a paper cover, or any other desired trackable action that includes a distinctive audio counterpart. Further, depending on environmental factors, sounds such as a swallowing sound, breathing, talking or other audible information may be used to supplement a determination originally made based upon visual confirmation.

After such recognition, at step 215, feedback is provided to the user eating the candy, preferably on the device used to determine whether the user has eaten the candy. Thus, a display may be provided on the device to allow the user to see their face during use (while a camera is used to determine their actions). Such feedback may be provided on that same display.

After providing such feedback, at step 220, confirmation of eating the candy by the participant is broadcast to one or more social networking sites, and including at least part of the feedback provided to the user. In accordance with an embodiment of the invention, this broadcasting may include uploading a video clip of the participant eating the candy, along with the displayed feedback at step 225. Such video may comprise actual images of the participant, animation or rotoscoping based thereupon, or otherwise serving images or audio associated with the participant. Additionally, a notification may be provided to one or more friends of the participant on the social networking site that such eating of the candy has taken place at step 230. Finally, at step 235 an incentive may be provided to the participant based upon confirmation of the broadcast. Additional incentives may be provided upon various friends responding to the notification of the broadcast, viewing of the video by a friend, or the like. Such incentives may also be provided to those friends. These friends may also be requested or offered to use the system via an invitation to download a particular app, or link to a website. Facial recognition techniques known to those of ordinary skill in the art may be used to determine an identity of individuals eating the candy, while time stamping, etc. may be employed with additional timing and channel information to confirm watching of a particular program. GPS information may further be employed to confirm a location of consuming of the particular item, and cumulative information may be employed to generate a "consumption map", thus allowing for a visual presentation of consumption.

Figure 3:
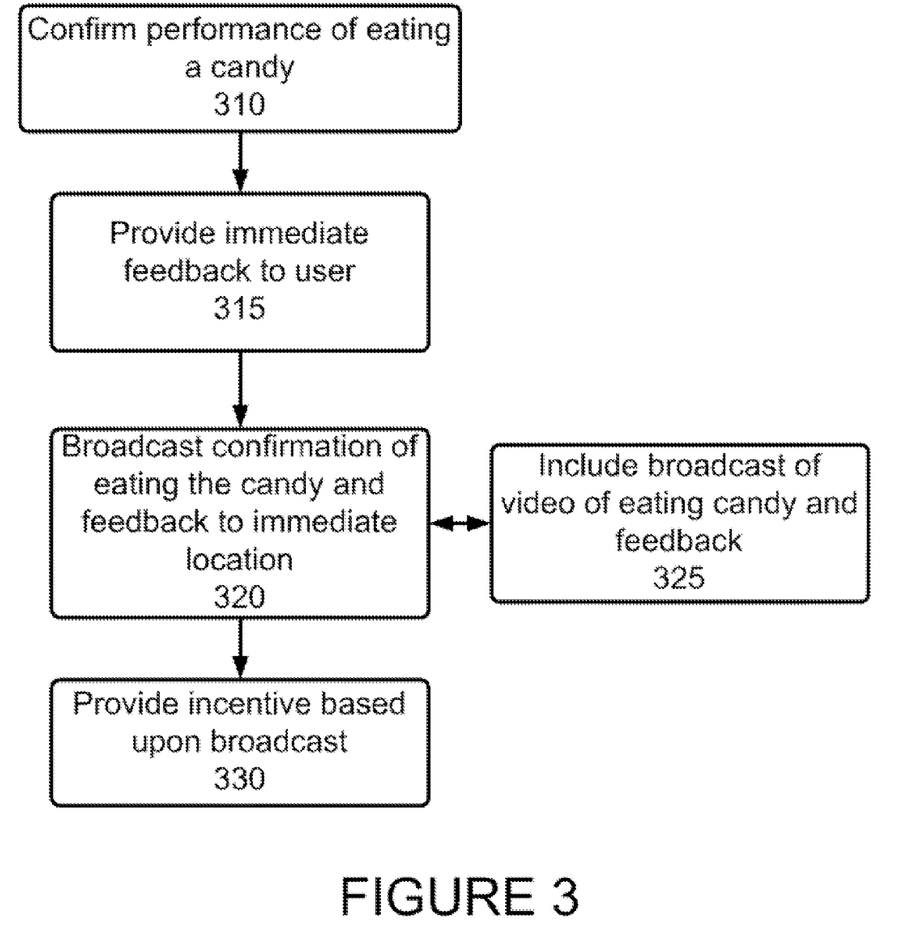
FIG. 3 is a flowchart diagram depicting yet another embodiment of the invention in a live participation environment.

Referring next to FIG. 3, an embodiment of the invention is described to be employed in a live location. First, at step 310, performance of eating of a candy by a participant is confirmed through the user of a mobile device or the like. In accordance with various embodiments of the present invention such confirmation is preferably determined in accordance with one or more machine vision or activity recognition techniques. After such recognition, at step 315, immediate feedback is provided to the participant indicative of successful eating of the candy, preferably displayed on a display of the mobile device or the like. Such feedback may include video, audio or other information, and may preferably be related to a particular marketing campaign, or otherwise related to the candy, Next, at step 320, confirmation of eating the candy by the participant, and also the displayed feedback, is broadcast to the immediate location about the participant. Such immediate location may be at a home, public location, restaurant bar, or other place where people congregate. Such broadcasting is preferably employs presentation of a video of the participant consuming the consumable item at step 325 coupled with the feedback provided to the participant, and may be accompanied by audio, messaging, or the like to further advertise the broadcast. If video is not available, these other methods of broadcasting may be employed alone. Finally, at step 330, an incentive is provided based upon the broadcast. The incentive may be directed to the participant or others in the location of the broadcast.

In accordance with one or more embodiments of the present invention, and as set forth in each of the above scenarios, the direct observation of the eating of a candy or the like includes an automated visual confirmation that a consumer has eaten the candy or the like. This eating of the candy may be performed in return for some benefit. Further, evidence of this candy eating may be broadcast to others via a number of methods, such as through a live video at a particular location, broadcasting via a social networking site, or the like. Incentives and rewards may be provided to the participant, or others viewing the participant. On each of these scenarios, behavior shaping (i.e. influencing the behavior) of the user and other friends or viewers of the participant is accomplished. First, the peer network of the participant is made aware of the actions of the participant on a one-to-many basis. Second, a monetary or other desirable incentive may be provided to the participant or others related to the product, such as a coupon, discount on a next purchase, free products, or even an incentive via the social network for the user, or perhaps one or more friends of the user. Finally, a gaming aspect of the situation is presented in which the steps of eating (or properly placing in the mouth or on the tongue) the candy, number of times of eating a candy, etc. may be integrated into a game or the like, accumulating points or other desirable scoring markers, thus providing an incentive to consume additional consumable items, and to provide positive reinforcement for performing various actions. Such actions thus shape behavior in a manner likely to increase consumption of the candy. As noted above, multi player and interactive consumption maps may also be included.

Figure 4:
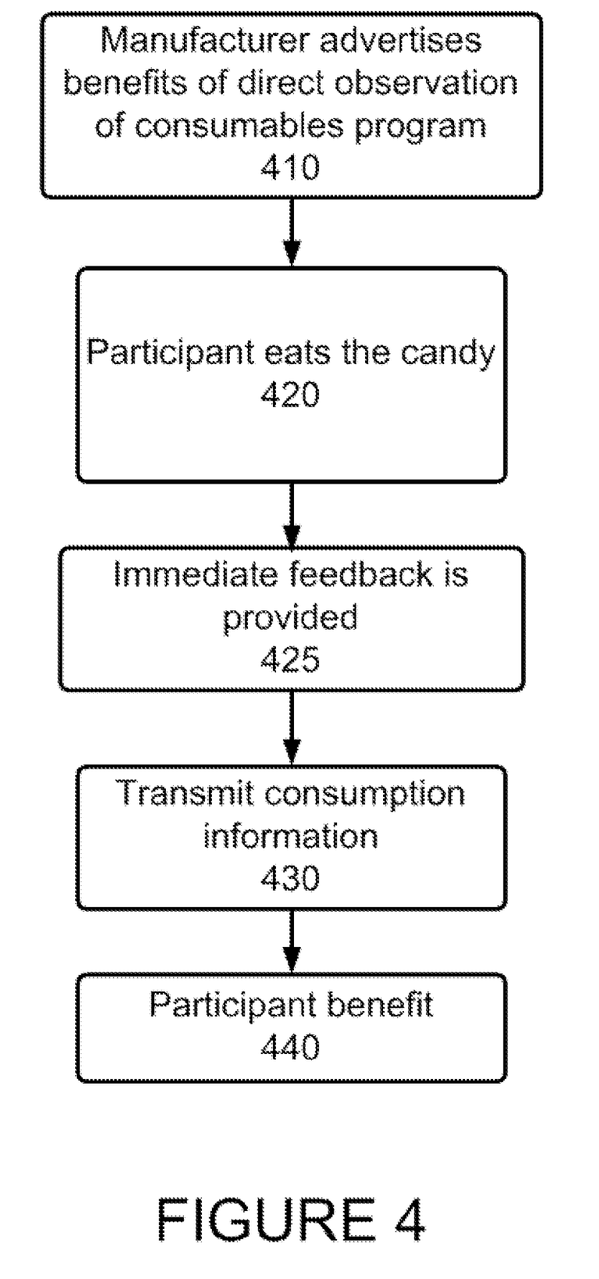
FIG. 4 is an overall process flow according to an embodiment of the invention.

In each of the above-described scenarios, it is contemplated that consumption of a consumable, such as eating of a candy or the like, is determined. In accordance with an embodiment of the invention, the task of determining consumption may be broken down to a small number of easy to determine tasks. The sum sequential performance of these tasks may then be determined to be evidence of completion of the task. For a consumable such as a, candy or other edible object, these sub-steps may comprise confirming the candy in the mouth of the user, confirming closing of the mouth, and then confirming an empty mouth. Of course, any other sequence may be employed. As is noted above, one important step may be the identification of a product, such as a candy, to be consumed by the user. Such identification may take place using any known identification system, but may also employ an inventive system for making a determination of the object in accordance with a web camera on a mobile device of a user, a camera covering a large area of a public or private space, or other desired location. A group of individuals may be asked to show the item to the camera system, or otherwise perform a group consumption activity employing the item. Thus, the system is able to be provided with an object to be matched, and then search through a particular location to find and identify such an object. Once discovered, when one or more images or video of the consumption of the candy, the object may be highlighted or otherwise given prominence in the display so that one or more users viewing the display will be made immediately aware of the product in question. Thus a candy of a desired type may be highlighted or otherwise emphasized in a display, or a logo or other identifying feature of the candy may be highlighted or magnified to give prominence during a broadcast. Furthermore, one or more overlaid statements or advertising images may be employed to further highlight the item of logo, or to otherwise provide additional exposure and advertising to be viewed or heard in accordance with such a broadcast, and may be provided in accordance with feedback to the user, or otherwise Referring next to FIG. 4, a flowchart diagram depicting process flow in an overall system employing one of the scenarios noted in FIGS. 1-3 is described. As is show in FIG. 4, first a manufacturer or other interested party may advertise the benefits of the direct observation of consumables, such as a candy, program at step 410. Such advertising may take place online or offline media. Incentives to join and participate in the program may be described as points for discounts on future purchases, or redemption for free merchandise, a lottery system for free merchandise from among those reaching a certain point threshold, a general points/credit system based upon the number of friends or others who see you consuming the consumable (or who download an application allowing them to play the game), and incentives for your network, such a coupons for an online network, or free consumables for a live network, or the like. Then, at step 420, a participant initiates the process of eating a candy in a manner that is trackable by a system provided for such tracking at step 420. Thus, the user may be asked to perform a short number of steps in view of a web camera included with a video phone or other mobile device, or other apparatus available for recording and analyzing participant actions. The user may first be asked to log into the system, such as by facial recognition, or by password or other identifying system, such as, for example, a biometric recognition system, or a log in via an existing network, such as a social network account or the like. Such identification system, or other identification system including a barcode or other identifier printed to an individual candy, item, or packaging, may be employed in order to avoid any malicious intent on the part of the user, and indeed any other identification verification may be employed. Next, the participant may be asked to hold up the candy to the camera so that the candy may be identified. If the candy or other item is not the expected item, the participant may be told of the error, and be encouraged to obtain the proper item. If the incorrect item can in itself be identified, benefits of the proper item over the shown item may be displayed. Finally, the participant may be asked to eat the candy. Such consumption may be requested according to a particular format so that the system is able to confirm that the participant has performed the desired action. After such consumption, at step 425, immediate feedback may be provided to the user, and may include feedback to praise the user and to encourage further eating of the candy. Next, at step 430, data related to eating the candy is transmitted to a remote location, or stored locally, in accordance with the desired network. In addition to processing and sending a video, mini-video, series of thumbnail images, animation or the like, and preferably highlighting or otherwise identifying the consumable product to make it stand out and differentiate it from other objects and backgrounds in the image, time and date of the action may be recorded and transmitted, along with participant identification, and an indication of consumption logged, along with the same or different feedback provided to the user. Once transmitted, this information may further be provided to one or more social networks, friends who have performed similar tasks, or who have been entered in a game to track such consumption, and the like. Finally, at step 440, the participant may receive one or more benefits upon confirmation of consumption and transmission of the consumption and feedback related information. Thus, points may be added to the participant's account, peers in either an online or offline network may be notified of receipt of the incentive and be shown the consumption, via video or other messaging, such as texting, email, audio or the like. The participant may receive monetary incentives, such a cash back, or discounts on future purchases. Additionally, peers of the participant may receive one or more incentives in order to encourage similar consumption, or simply for viewing the broadcast of consumption by the participant. Additional features such as encouragement upon completion of tasks or watching of broadcasts may be provided, including automated applause, or other visual identifiers related to completion of a task, and may be provided as feedback to the user, or as displayed along with a broadcast of information to others. Thus, for example, upon eating of a candy or performance of other desired action, indications may be provided adjacent the mouth of the participant related to the consumed item. Any other type of reinforcement may be provided.

In accordance with an alternative embodiment of the present invention, a dashboard may be provided to a program manager to review one or more accounts for one or more participants, thus determining a number of times the user has eaten the candy, and may allow for determinations of whether various marketing or other incentives increase such consumption. Additionally, it may be possible to determine whether the action of consumption by an individual influences consumption by other individuals in the user's social network, immediate physical location, or anyone otherwise knowledgeable of such consumption in accordance with any of the methods described above. Thus, "peer tracking" may be employed in order to test the viral expansion of a particular campaign, or the like. By seeing who clicks through a particular broadcast, movement of the campaign through one or more peer networks may be determined. Various additional diagnostics may be provided as appropriate, and including one or more features allowing for adjustment of various marketing or incentive programs in accordance with one or more reported statistics, and may allow for the review of changes in behavior for one or more users based upon changes in incentive. Changes in such incentives may be based upon any desirable statistic, and may be applied to one, many or classes of individuals based upon demographic, location, or other classification metrics. Thus, for example, various aged individuals in certain locations may be provided with an incentive, while others in different locations may receive another. Further heavy consumers may receive further incentive, or the like. In addition to reviewing such changes in user behavior, monitoring may be provided to determine whether recurring consumption is taking place in a position in which it should not. For example, such a system may determine that a particular individual has consumed more than a predetermined number of drinks, thus notifying to stop such activity, or provide other information to the user that may be appropriate given the determined action. Further such a system may also initiate further actions automatically, such as requesting a taxi, thus allowing for encouragement of safe driving. Various other actions may be preprogrammed by the participant form one or more situations, such as calling or otherwise alerting a friend or family member or the like.

It is therefore anticipated that upon incenting participants to consume consumable items in such a manner, and when displaying additional encouragement or advertising information, peers in their network will know about this consumption, and will similarly be incented to also consume the consumable in a similar manner. Cross-selling of related consumables or other products may also be provided. As noted above, the ability to broadcast such consumption via one or more well known social networking sites has the potential to allow for a limitless number of peers to be reached, each becoming a participant and reaching out to their network as well. It is this network effect that is anticipated to greatly increase consumption of such a consumable product.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for notification of confirmation of performance of an action, comprising the steps of:
    defining a plurality of sub-steps indicative of performance of a predetermined action, the sub-steps comprising at least the steps of confirming the presence of an object in the mouth of an individual, confirming the closing of the mouth of the individual, and confirming an empty mouth of the individual;
    determining performance by the individual of each of the sub-steps by a computer processor in accordance with machine vision activity recognition performed on one or more images obtained by a camera;
    providing feedback related to the determined performance of the predetermined action;
    broadcasting confirmation of performance of the predetermined action along with at least a portion of the provided feedback by a transmission system associated with the computer processor to one or more peers of the individual as defined on one or more social networking sites; and
    providing an incentive to the individual based upon the broadcasting.

2. The method of claim 1, wherein the predetermined action comprises eating a predetermined object.

3. The method of claim 2, wherein upon determination of eating a different object, one or more benefits of the predetermined object over the different object are provided as at least a portion of the provided feedback.

4. The method of claim 1, wherein the broadcasting is performed via a social networking site.

5. The method of claim 4, wherein the broadcasting further comprises transmitting a video of the performance of the predetermined action and at least a portion of the feedback.

6. The method of claim 1, wherein the incentive comprises a monetary incentive to the performer of the action.

7. The method of claim 1, wherein the incentive comprises an incentive to one or more peers of the performer of the action viewing the broadcast.

8. The method of claim 1, wherein the incentive further comprises an incentive to one or more peers of the performer of the action upon performance of the predetermined action by the one or more peers.

9. A computer program stored on a non-transitory computer readable medium, the computer program causing a general purpose computer to perform the steps of:
    defining a plurality of sub-steps indicative of performance of a predetermined action, the sub-steps comprising at least the steps of confirming the presence of an object in the mouth of an individual, confirming the closing of the mouth of the individual, and confirming an empty mouth of the individual;

determining performance by the individual of each of the sub-steps by the general purpose computer in accordance with machine vision activity recognition performed on one or more images obtained by a camera;

providing feedback related to the determined performance of the predetermined action;

broadcasting confirmation of performance of the predetermined action along with at least a portion of the feedback; and providing incentive based upon the broadcasting.

10. The computer program of claim 9, wherein the predetermined action comprises eating an edible object.

11. The computer program of claim 9, wherein the broadcasting is performed via a social networking site.

12. The computer program of claim 11, wherein the broadcasting further comprises transmitting a video of the performance of the predetermined action along with the portion of the feedback.

13. The computer program of claim 9, wherein the computer program further causes the general purpose computer to further perform image capture via an associated mobile device including a camera.

14. The computer program of claim 13, wherein the computer program further causes the general purpose computer to display feedback to a user on a display of the mobile device.

15. A system for confirming action, comprising:

an image acquisition system for acquiring an image of an individual performing an action;

a processor for defining a plurality of sub-steps indicative of performance of a predetermined action, the sub-steps comprising at least the steps of confirming the presence of an object in the mouth of an individual, confirming the closing of the mouth of the individual, and confirming an empty mouth of the individual, and for analyzing the acquired image to determine whether the individual has performed each of the sub-steps in accordance with machine vision activity recognition;

a display for displaying feedback related to the determination of the performance of the action by the participant; and a transmission system for broadcasting confirmation of performance of the predetermined action along with at least a portion of the feedback;

wherein the participant is provided an incentive based upon the broadcasting.

16. The system of claim 15, wherein the predetermined action comprises eating an item.

17. The system of claim 15, wherein the broadcasting is performed via a social networking site.

18. The system of claim 17, wherein the broadcasting further comprises transmitting a video of the performance of the predetermined action along with the portion of the feedback.

\* \* \* \* \*